(12) United States Patent
Aoki et al.

(10) Patent No.: US 6,748,319 B2
(45) Date of Patent: *Jun. 8, 2004

(54) REMAINING DISTANCE METER

(75) Inventors: Katsuhito Aoki, Saitama (JP); Takashi Kudo, Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/922,713

(22) Filed: Aug. 7, 2001

(65) Prior Publication Data

US 2002/0026280 A1 Feb. 28, 2002

(30) Foreign Application Priority Data

Aug. 9, 2000 (JP) ........................................ 2000-241079

(51) Int. Cl.$^7$ ........................ G01L 21/32; G08G 1/0969
(52) U.S. Cl. ........................ 701/201; 701/210; 701/211; 340/995.27
(58) Field of Search ................................ 701/201, 204, 701/205, 210, 211; 33/542; 340/995, 995.17, 995.23, 995.27

(56) References Cited

U.S. PATENT DOCUMENTS

| 4,053,749 | A | * | 10/1977 | Shinoda et al. | ............ 235/95 R |
| 4,847,785 | A | * | 7/1989 | Stephens | ...................... 345/157 |
| 5,323,321 | A | * | 6/1994 | Smith, Jr. | ...................... 340/990 |
| 5,686,895 | A | * | 11/1997 | Nakai et al. | ................. 340/636 |
| 5,781,872 | A | * | 7/1998 | Konishi et al. | ............. 340/438 |
| 5,951,621 | A | * | 9/1999 | Palalau et al. | ............. 340/988 |
| 6,023,652 | A | * | 2/2000 | Arakawa et al. | ............ 340/995 |
| 6,078,864 | A | * | 6/2000 | Long et al. | .................. 701/209 |
| 6,119,068 | A | * | 9/2000 | Kannonji | ..................... 180/271 |
| 6,249,744 | B1 | * | 6/2001 | Morita | ....................... 340/988 |
| 6,412,187 | B1 | * | 7/2002 | Sasaki et al. | .................. 33/542 |

FOREIGN PATENT DOCUMENTS

| JP | 03162618 A | * | 7/1991 | .......... G01C/21/00 |
| JP | 8-136271 | * | 5/1996 | |
| JP | 09325046 A | * | 12/1997 | .......... G01C/22/00 |
| JP | A1041980 | | 5/1998 | |

* cited by examiner

*Primary Examiner*—Tan Q. Nguyen
(74) *Attorney, Agent, or Firm*—Birch, Stewart, Kolasch & Birch, LLP

(57) ABSTRACT

A remaining distance meter for easily assuring detection of the remaining distance up to the destination from the current position and for recognizes intuitively and visually whether the vehicle is running closer toward the destination or becoming far from the destination. A remaining distance meter is displayed on the display area of the navigation apparatus to realize a graphic display which expands and compresses depending on the distance up to the destination from the current position. In the remaining distance meter, the reference distance mark is previously given and the distance up to the destination from the current position is displayed at the starting time by defining the reference distance mark as the starting point. When the distance up to the destination from the current position is increased or decreased after the running of vehicle, the display of the remaining distance meter expands or compresses depending on an increase or a decrease of the remaining distance. When the remaining distance setting button is depressed during the running of the vehicle, the remaining distance from the reference distance mark defined as the starting point can be displayed in an enlarged size. Moreover, the mark for storing the remaining distance at the time when the remaining distance setting button is depressed can also be displayed.

14 Claims, 4 Drawing Sheets

REMAINING DISTANCE METER

BACKGROUND OF THE INVENTION

CROSS-REFERENCE TO RELATED APPLICATIONS

The present application claims priority of Japanese Patent Application No. 2000-241079 filed on Aug. 9, 2000, the contents thereof is hereby incorporated by reference.

1. Field of the Invention

The present invention relates to a remaining distance meter and particularly to a remaining distance meter for easily assuring intuitive recognition of the remaining distance through the display of remaining distance using a bar graph.

2. Description of Background Art

In recent years, there has been an increase in the number of apparatus for vehicle road navigation for offering visual information to guide the vehicle to a destination. This navigation apparatus may be classified into a map display type for displaying a road map on the display panel such as a liquid crystal panel and offering vehicle guidance information such as the present position of the vehicle and the vehicle running direction on the road map or may be classified as a map non-display type for offering vehicle guidance information without the use of the road map.

For example, JP-A No. HEI 10-141980 as set forth in the Japanese Official Gazette discloses a technique according to the map non-display type navigation apparatus. In this prior art, when the destination is set, the linear distance up to the destination from the current position and the vehicle guidance information such as arrow marks to indicate the direction of the destination are displayed on the display area provided at the center area of the handle of the vehicle such as a motorcycle.

In the navigation apparatus explained above, the distance up to the destination from the present position is displayed with a practical value. Therefore, when a driver tries to determine, while he/she is driving a vehicle, whether the vehicle is coming close to or becoming far from the destination, the driver is requested to remember the remaining distance A at the present position, then compare the remaining distance A after the running for a while with the remaining distance B displayed at present to subtract the distance B from the distance A through the comparison thereof. Therefore, such navigation apparatus has a problem wherein it is difficult to visually and intuitively determine whether the vehicle is coming close to or going farther away from the destination or how close the vehicle is or how far the vehicle is from the destination.

The present invention has been proposed considering the prior art explained above and it is therefore an object of the present invention to provide a remaining distance meter which easily provides the remaining distance up to the destination from the current position and moreover intuitively and visually recognizes whether the vehicle is coming close to or farther from the destination.

SUMMARY AND OBJECTS OF THE INVENTION

In order to achieve the purpose explained above, the present invention discloses a remaining distance meter of the navigation system for calculating and displaying the distance between the destination and the current position from the coordinates thereof. This remaining distance meter of the present invention has a first characteristic that a display unit is provided to realize a graphic display which expands and compresses depending on the remaining distance. According to this first characteristic, the distance up to the destination can be obtained any time as required when the vehicle is running and the distance obtained is displayed with expansion and compression of the graphic display and therefore a driver can visually and intuitively recognize such distance.

Moreover, the present invention has a second characteristic that a remaining distance setting button is further provided, when this remaining distance setting button is set, the display unit displays the remaining distance from the reference point preset as the starting point and thereafter the graphic display is expanded or compressed depending on an increase or decrease in the remaining distance. According to this characteristic, the remaining distance when the remaining distance setting button is set is displayed as the expanded display image to display the remaining distance from the current position defined as the starting point when the remaining distance setting button is set. Therefore, a degree of increase and decrease of the remaining distance can be recognized intuitively in detail.

Moreover, the present invention has a third characteristic that when the remaining distance setting button is set, the mark display for recording the remaining distance at that timing is added to such graphic display. According to this characteristic, an increase or decrease of the remaining distance from the timing when the remaining distance setting button is set can be recognized visually and intuitively, in addition to the display of the remaining distance for the initial remaining distance as a whole at the time when the vehicle has started operating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
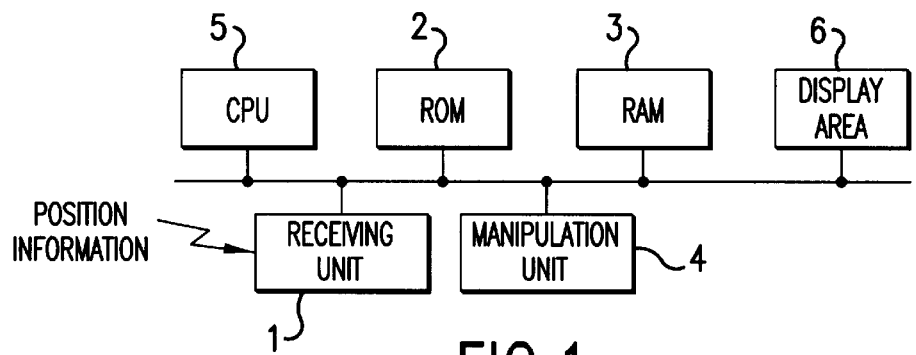
FIG. 1 is a block diagram schematically illustrating the hardware structure of the navigation apparatus to which the present invention is applied.

The present invention will be explained in detail with reference to the accompanying drawings. FIG. 1 is a block diagram schematically illustrating the hardware structure of the navigation apparatus.

A receiving unit 1 forms a GPS (Global Positioning System) for measuring the current position (latitude, longitude) of a vehicle by receiving the signal from an artificial satellite and the ROM 2 stores a control program for operating the navigation apparatus and also stores names of the facilities (for example, public facilities of a city, town and village offices and leisure facilities or the like) and latitude, longitude of such facilities or the like. The RAM 3 stores tentatively various data during operations of the navigation apparatus and also offers the job area for various calculating operations. A manipulation unit 4 has a menu button for selecting navigation, a scroll button used for setting the destination or the like or a remaining distance setting button or the like explained later. The CPU 5 drives the control program stored in the ROM 2 based on the current position information (coordinates) obtained from the receiving unit 1 and the destination (coordinates) information preset with the manipulation unit 4 to display the direction of the destination observed from the current position of vehicle and distance up to the destination from the current position or the like to display such information on the display area 6. The display area 6 is formed of a liquid crystal panel or the like and is allocated at the area near the center of the handle of a motorcycle or the like.

Figure 2:
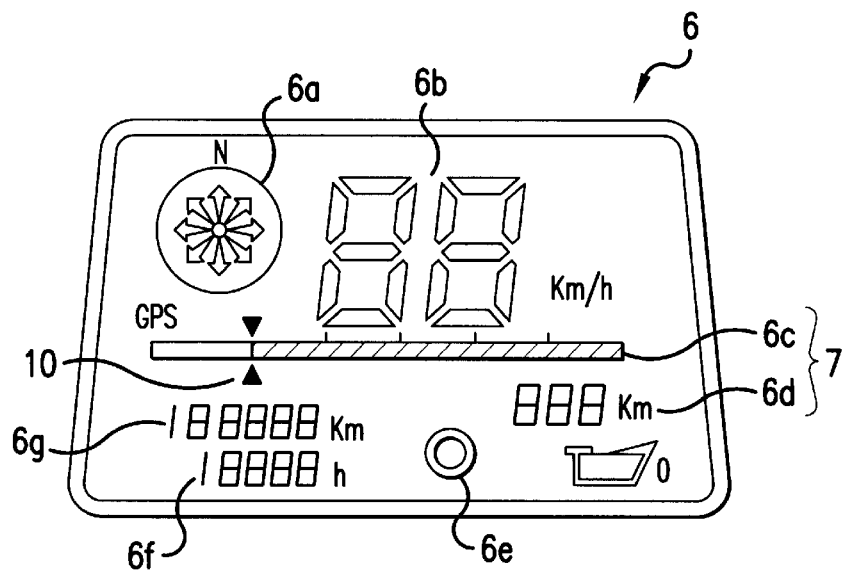
FIG. 2 is a diagram illustrating a display example of the display area.

FIG. 2 illustrates a display example at the display area 6. This display example includes a direction display area 6a indicating the direction of destination when the running direction of vehicle is defined in the upper direction of the figure, a speed meter 6b, a first remaining distance meter 6c using the graphic display such as a bar graph display or the like, a second remaining distance meter 6d for displaying the remaining distance with a numerical value, a remaining distance setting button 6e, a distance meter 6f indicating the total running distance of the vehicle and a time meter 6g for indicating total running time or the like. In the following explanation, the first and second remaining distance meters 6c, 6d are called in general as a remaining distance meter 7.

Figure 3A:
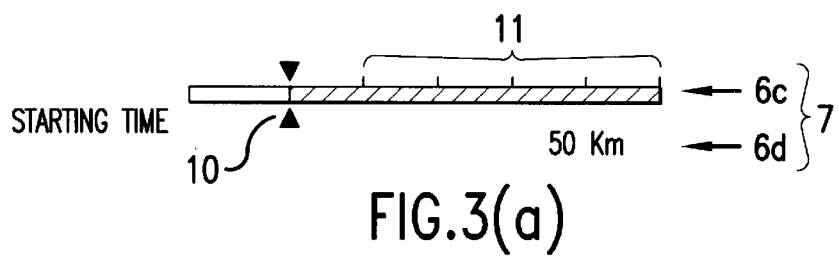
FIGS. 3(a) and 3(b) are diagrams illustrating the display unit for the graphic display of a first embodiment of the present invention.

Next, the remaining distance meter 7 in the preferred embodiment of the present invention will be explained in detail with reference to FIGS. 3(a) and 3(b). The procedures up to setting of the destination may be realized with the method disclosed in the JP-A No. HEI 10-141980 and the other well-known methods.

The bar graph of the remaining distance meter 7 is provided with the reference distance mark 10 and for example, the five graduation 11 set at equal intervals. At the time of setting the destination (starting time), the color display (for example, blue) appears in the full-scale in the right side of the reference distance mark 10 defined as the starting point and the linear distance up to the destination from the current position is displayed with the numerical value. For example, when the total distance between the current position and destination is 50 km, a bar graph is displayed in the full scale as illustrated in FIG. 3(a) and the total distance of 50 km is displayed with the numerical value on the lower side.

Figure 3B:
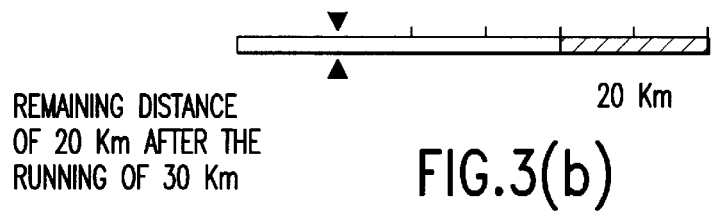

Next, when the vehicle continuously runs for 30 km and comes close to the destination, the remaining distance meter 7 is displayed as illustrated in FIG. 3(b). Namely, in the bar graph of the remaining distance meter 7, the display up to the third graduation on the right side from the reference distance mark 10 disappears and the right side of the third graduation is displayed in a blue color. Moreover, the remaining distance is displayed with the value of 20 km.

Figure 4:
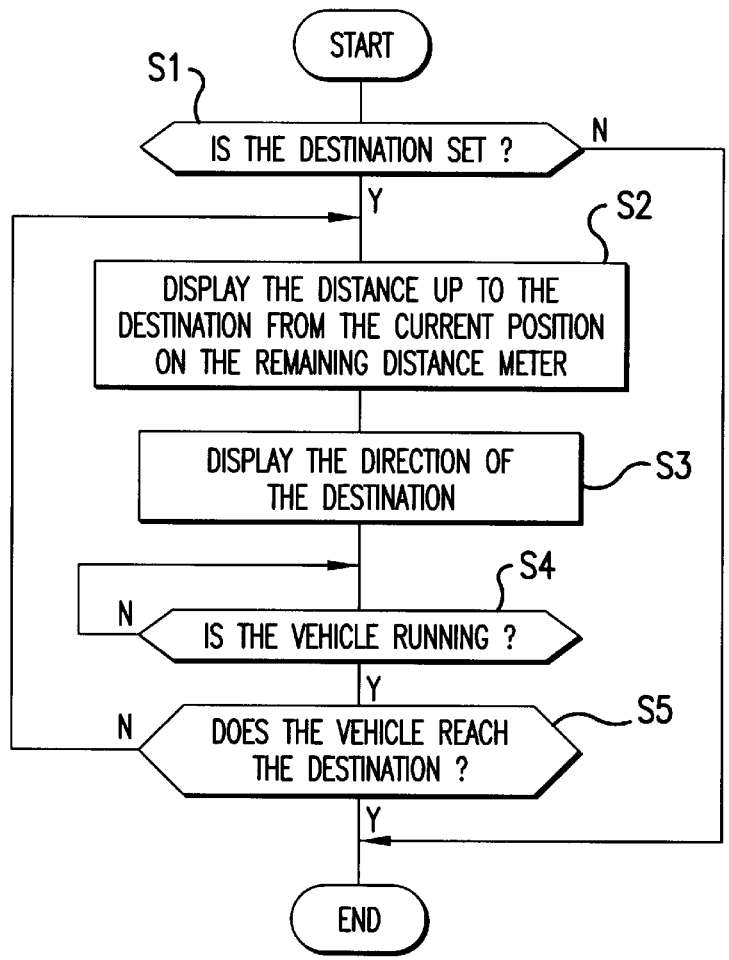
FIG. 4 is a flowchart indicating the function of a CPU for the first embodiment.

The function of the CPU 5 in this embodiment will be explained with reference to the flowchart of FIG. 4. The CPU 5 determines whether the destination is set in the step S1 or not. When the result is YES, the process goes to the step S2 to calculate the distance up to the destination from the current position. The result is displayed on the remaining distance meter 7. This display example is illustrated in FIG. 3(a). Next, the process goes to the step S3 and direction of the destination is obtained and is then displayed in the direction display area 6a. In the step S4, it is determined whether the vehicle is in operation or not. When the result is YES, the process goes to the step S5 to determine whether the vehicle has reached the destination or not. When the result is NO, the process returns to the step S2, the distance between the present position and destination is displayed on the remaining distance meter. The process goes to the step S3 and the direction of destination observed from the running direction of the vehicle is displayed on the display area 6a. The above process is repeated and when the result of the destination in the step S5 is YES, a series of processes are completed.

According to this embodiment, since the display of the bar graph expands and compresses depending on the remaining distance, a degree of decrease in the remaining distance up to the destination can be detected visually and intuitively. Here, the reference distance mark 10 is provided within the inside of the predetermined distance from one end of the bar graph, namely a little display area is provided on the left side of the reference distance mark 10, because in some cases the vehicle operates in a direction to become farther from the destination and such operating condition is displayed to urge the driver to pay attention to the operating direction.

Figure 5A:
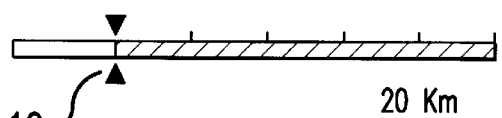
FIGS. 5(a) and 5(b) are diagrams illustrating the display unit for the graphic display of a second embodiment of the present invention.
Figure 5B:
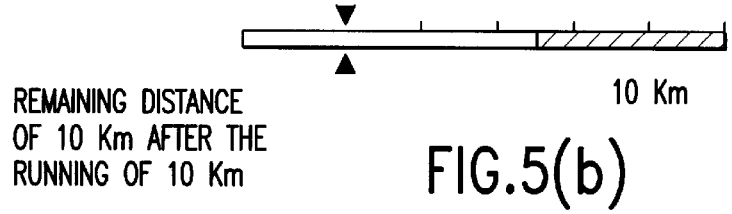

Next, the second embodiment of the present invention will be explained with reference to FIGS. 5(a) and 5(b). In this embodiment, when a driver depresses the remaining distance setting button 6e in the condition of FIG. 3(b), the remaining distance of 20 km is displayed in the enlarged side in the full scale on the right side with reference to the reference distance mark 10 as illustrated in FIG. 5(a). When the vehicle further runs for 10 km toward the destination, the remaining distance of 10 km is displayed as illustrated in FIG. 5(b).

Figure 6:
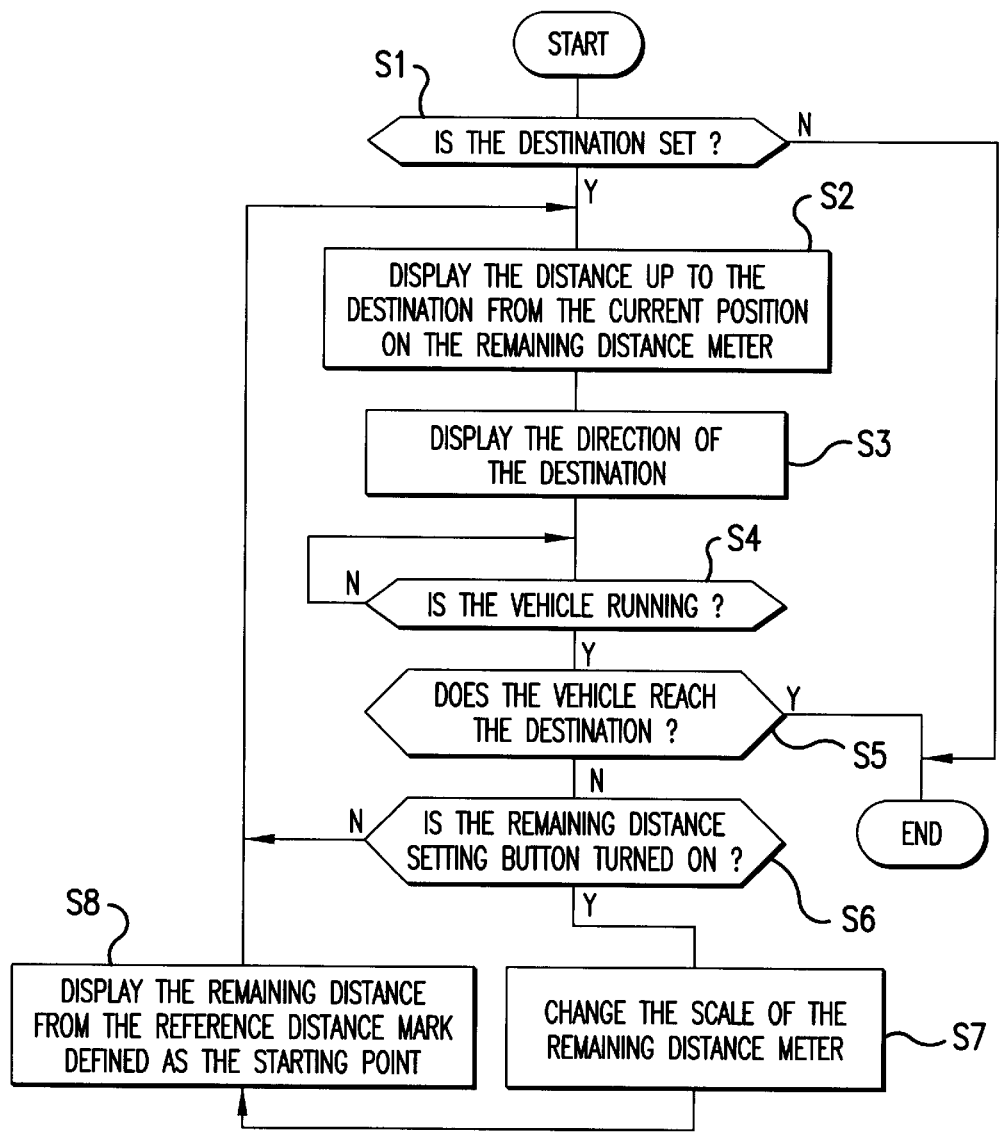
FIG. 6 is a flowchart indicating the function of a CPU for the second embodiment.

The function of the CPU 5 in this embodiment will be explained with reference to the flowchart of FIG. 6. The processes of the steps S1 to S5 are identical to that of FIG. 4 and explanation of these steps is omitted here. When the destination in the step S5 is NO, the process goes to the step S6 to determine whether the remaining distance setting button 6e is set to ON or not. When the result is YES, the process goes to the steps S7 and S8. Thereby, the scale of the remaining distance meter is updated and the remaining distance is displayed on the enlarged size on the right side of the remaining distance mark 10 (refer to FIG. 5(a)).

Thereafter, according to this embodiment, it can be recognized intuitively how much the vehicle has become closer to the destination from the reference distance mark 10 defined as the starting point. Moreover, the remaining distance is displayed in the enlarged size and a driver can intuitively recognize in detail the degree of increase or decrease of the remaining distance up to the destination.

Figure 7A:
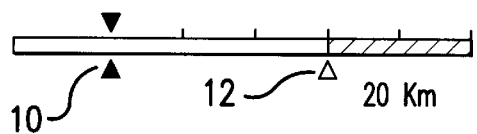
FIGS. 7(a) and 7(b) are diagrams illustrating the display unit for the graphic display of a third embodiment of the present invention.

Next, the third embodiment of the present invention will be explained with reference to FIGS. 7(a) and 7(b). In this embodiment, when a driver depresses the remaining distance setting button 6e in the condition illustrated in FIG. 3(b), the mark 12 is displayed at the position of the remaining distance of 20 km as illustrated in FIG. 7(a). When the vehicle continuously runs for 10 km toward the destination, the remaining distance of 10 km is displayed as illustrated in FIG. 7(b).

Figure 8:
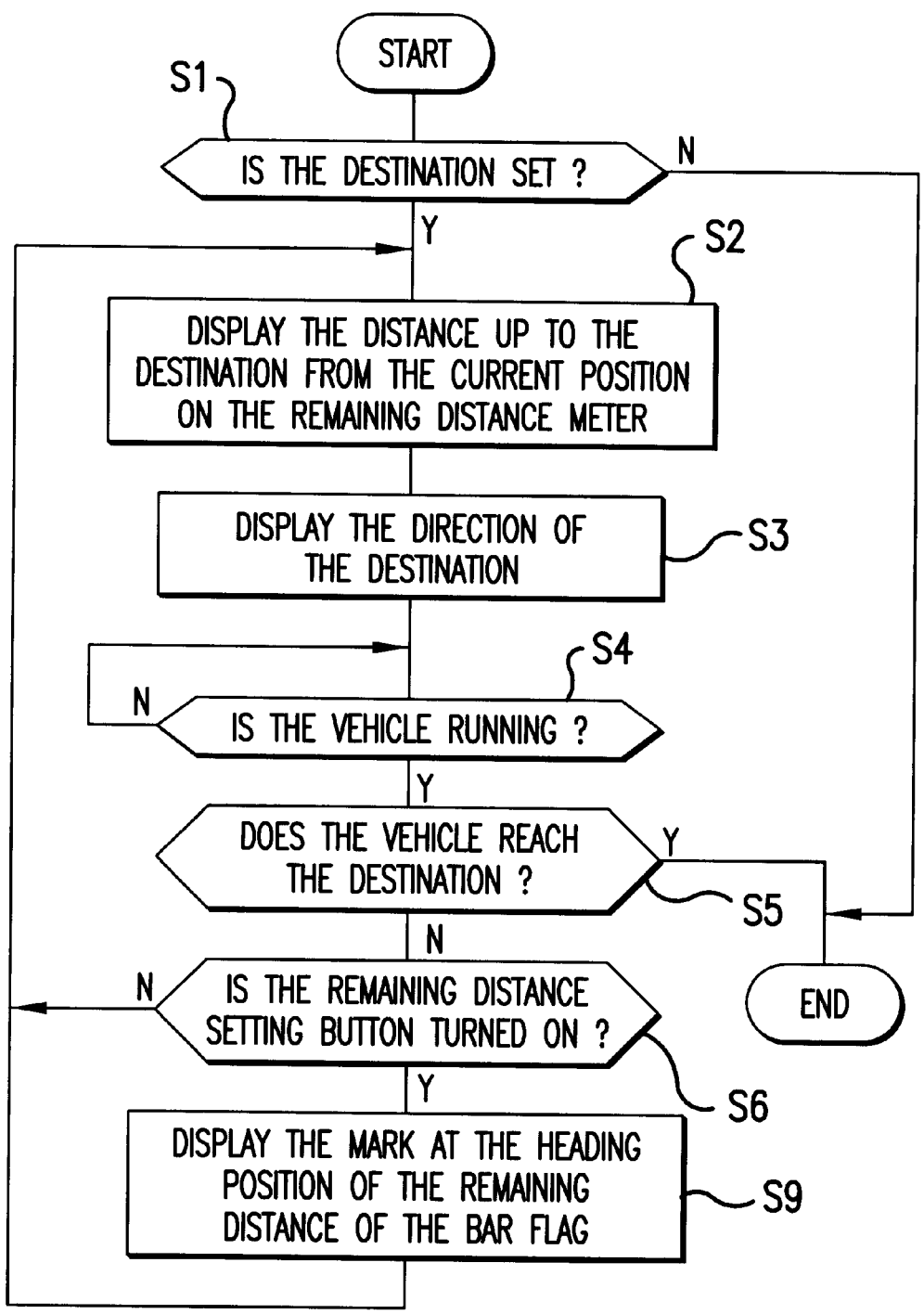
FIG. 8 is a flowchart indicating the function of a CPU for the third embodiment of the present invention.

The function of the CPU 5 in this embodiment will be explained with reference to the flowchart of FIG. 8. Since the processes in the steps S1 to S6 are identical to that of FIG. 6, explanation of these processes is omitted here. When the destination in the step S6 is YES, the process goes to the step S9 and the mark 12 is displayed at the starting portion of the remaining distance of the bar graph. Thereafter, the process returns to the step S2 and the processes explained above are continued.

As a result, according to this embodiment, the distance the vehicle has traveled nearer toward the destination from the mark 12 defined as the new starting point can be intuitively recognized and the remaining distance to the total remaining distance at the starting time can be relatively and intuitively recognized.

Figure 7B:
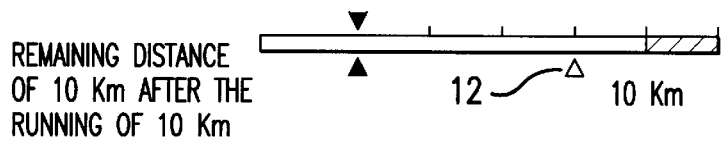

The present invention is not limited to above embodiments and it is also possible in the present invention that the displays of FIG. 5(b) and FIG. 7(b) may be switched alternately. Moreover, it is also possible to simultaneously realize the displays by utilizing the displays of FIGS. 5(a) and 5(b) and FIGS. 7(a) and 7(b).

As will be apparent from above explanation, according to the present invention, a decrease in the remaining distance up to the destination can be recognized visually and intuitively during the operation of the vehicle.

Moreover, according to the present invention, since the remaining distance up to the destination is displayed in the enlarged size, decrease in the remaining distance can be recognized intuitively in detail.

Moreover, according to the present invention, since the remaining distance when the remaining distance setting button is set is recorded as the mark, the remaining distance for the initial remaining distance at the starting point can be displayed and moreover increase or decrease of the remaining distance at the time when the remaining distance setting button is set can be recognized visually and intuitively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remaining distance meter of a navigation apparatus for calculating and displaying distance between a destination and a current position from coordinates thereof, comprising:
   a display unit for exhibiting a graphic display by expanding and compressing a predetermined length of a bar graph depending on a remaining distance, said display unit including a first reference point, defined as an original starting point, the first reference point being fixed at an intermediate point along a length of the display unit, the display unit further including a second reference point representing a distance to the destination on one extreme side of the display unit,
   wherein at a start of operation of the meter, the bar graph extends substantially from the first reference point representing the original starting point to the second reference point representing the distance to the destination, and thereafter during travel, an end of the bar graph moves to one side or another of the first reference point depending on an increase and decrease of said remaining distance.

2. The remaining distance meter according to claim 1, further comprising a remaining distance setting button, wherein said display unit displays, when said remaining distance setting button is set, the remaining distance from said first reference point as the starting point is displayed, and thereafter the bar graph expands and compresses the graphic display depending on an increase and decrease of the remaining distance.

3. The remaining distance meter according to claim 1, further comprising a remaining distance setting button, wherein said display unit adds, when said remaining distance setting button is set, a mark display for recording the remaining distance at that timing to said graphic display.

4. The remaining distance meter according to claim 1, wherein said bar graph is divided into a predetermine number of segments wherein each segment represents a predetermined distance whereby setting the bar graph to a first predetermined distance permits a user to see a visual display of the total length of distance to a destination and further including distance calculating means for determining the distance traveled over a predetermined time period for reducing the visual display to represent the distance remaining to the destination.

5. The remaining distance meter according to claim 4, wherein the entire visual display is utilized for displaying a first predetermined distance.

6. The remaining distance meter according to claim 4, wherein a portion of the visual display is utilized for displaying the first predetermined distance.

7. The remaining distance meter according to claim 1, wherein during travel the one side of the bar graph indicating the remaining distance moves with respect to the first reference point as the remaining distance changes, but an opposite side of the bar graph remains fixed at the point representing the distance to the destination.

8. A remaining distance meter for a navigation apparatus comprising:
   a display unit for visually displaying a predetermined length commensurate with a predetermined distance on a graphic display, the graphic display being a bar graph;
   means for calculating a remaining distance to a destination and a current position from coordinates thereof;
   means for setting and displaying a distance to the destination on said display unit; and
   means for displaying the remaining distance to the destination by expanding and compressing the visual display on said display unit, said display unit including a first reference point, defined as an original starting point, the first reference point being fixed at a an intermediate point along a length of the display unit, the display unit further including a second reference point representing a distance to the destination on one extreme side of the display unit,
   wherein at a start of operation of the meter, the bar graph extends substantially from the first reference point representing the original starting point to the second reference point representing the distance to the destination, and thereafter during travel, an end of the bar graph moves to one side or another of the first reference point depending on an increase and decrease of said remaining distance.

9. The remaining distance meter according to claim 8, further comprising a remaining distance setting button, wherein said display unit displays, when said remaining distance setting button is set, the remaining distance from said first reference point as the starting point is displayed, and thereafter the bar graph expands and compresses the graphic display depending on an increase and decrease of the remaining distance.

10. The remaining distance meter according to claim 8, further comprising a remaining distance setting button, wherein said display unit adds, when said remaining distance setting button is set, a mark display for recording the remaining distance at that timing to said graphic display.

11. The remaining distance meter according to claim 8, wherein said bar graph is divided into a predetermine number of segments wherein each segment represents a predetermined distance whereby setting the bar graph to a first predetermined distance permits a user to see a visual display of the total length of distance to a destination and said means for calculating a remaining distance determines the distance traveled over a predetermined time period for reducing the visual display to represent the distance remaining to the destination.

12. The remaining distance meter according to claim 11, wherein the entire visual display is utilized for displaying a first predetermined distance.

13. The remaining distance meter according to claim 11, wherein a portion of the visual display is utilized for displaying the first predetermined distance.

14. The remaining distance meter according to claim 8, wherein during travel the one side of the bar graph indicating the remaining distance moves with respect to the first reference point as the remaining distance changes, but an opposite side of the bar graph remains fixed at the point representing the distance to the destination.

* * * * *